US011127350B2

(12) United States Patent
Gai et al.

(10) Patent No.: US 11,127,350 B2
(45) Date of Patent: Sep. 21, 2021

(54) PIXEL CIRCUIT, ACTIVE MATRIX ORGANIC LIGHT EMITTING DIODE DISPLAY PANEL, DISPLAY APPARATUS, AND METHOD OF COMPENSATING THRESHOLD VOLTAGE OF DRIVING TRANSISTOR

(71) Applicant: BOE TECHNOLOGY GROUP CO., LTD., Beijing (CN)

(72) Inventors: Cuili Gai, Beijing (CN); Zhongyuan Wu, Beijing (CN); Baoxia Zhang, Beijing (CN); Ling Wang, Beijing (CN); Yicheng Lin, Beijing (CN); Quanhu Li, Beijing (CN); Fang Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 650 days.

(21) Appl. No.: 16/071,667

(22) PCT Filed: Aug. 2, 2017

(86) PCT No.: PCT/CN2017/095577
§ 371 (c)(1),
(2) Date: Jul. 20, 2018

(87) PCT Pub. No.: WO2019/023962
PCT Pub. Date: Feb. 7, 2019

(65) Prior Publication Data
US 2021/0201790 A1 Jul. 1, 2021

(51) Int. Cl.
*G06F 3/038* (2013.01)
*G09G 5/00* (2006.01)
(Continued)

(52) U.S. Cl.
CPC ......... *G09G 3/3258* (2013.01); *G09G 3/3233* (2013.01); *G09G 3/3291* (2013.01)

(58) Field of Classification Search
None
See application file for complete search history.

(56) References Cited

U.S. PATENT DOCUMENTS

2011/0122324 A1 5/2011 Yamashita et al.
2014/0168194 A1* 6/2014 Kong ................ H01L 29/78645 345/212

(Continued)

FOREIGN PATENT DOCUMENTS

CN 102074186 A 5/2011
CN 103871362 A 6/2014

(Continued)

OTHER PUBLICATIONS

International Search Report & Written Opinion dated May 2, 2018, regarding PCT/CN2017/095577.
Wikipedia website entry for "PenTile matrix family".

*Primary Examiner* — Kirk W Hermann
(74) *Attorney, Agent, or Firm* — Intellectual Valley Law, P.C.

(57) ABSTRACT

A pixel circuit includes a first transistor having a bottom gate and a top gate, a drain supplied with a high-level power-supply voltage, and a source coupled to a light-emitting diode (LED). The bottom gate is provided with a first voltage signal and the source is provided with a second voltage signal in a compensation period during which a present value of a threshold voltage of the first transistor is sensed at the source and a third voltage signal is determined based on the present value of the threshold voltage. The top (Continued)

gate is configured to be provided with the third voltage signal in an emission period to reduce the present value of the threshold voltage.

17 Claims, 6 Drawing Sheets

(51) Int. Cl.

| | |
|---|---|
| ***G09G 3/3258*** | (2016.01) |
| ***G09G 3/3233*** | (2016.01) |
| ***G09G 3/3291*** | (2016.01) |

(56) References Cited

U.S. PATENT DOCUMENTS

| | | | | |
|---|---|---|---|---|
| 2015/0294622 | A1* | 10/2015 | Chaji | G09G 3/3291 345/80 |
| 2016/0042694 | A1 | 2/2016 | Lim et al. | |
| 2017/0061892 | A1* | 3/2017 | Jung | G09G 3/3291 |
| 2018/0102397 | A1 | 4/2018 | Nie | |

FOREIGN PATENT DOCUMENTS

| | | | |
|---|---|---|---|
| CN | 105741779 | A | 7/2016 |
| CN | 105741781 | A | 7/2016 |
| CN | 106504707 | A | 3/2017 |
| JP | 2003273228 | A | 9/2003 |

* cited by examiner

FIG. 9 providing a first voltage signal to the bottom gate and a second voltage signal to the source in a compensation period to sense a present value of a threshold voltage of the driving transistor

Figure 9:
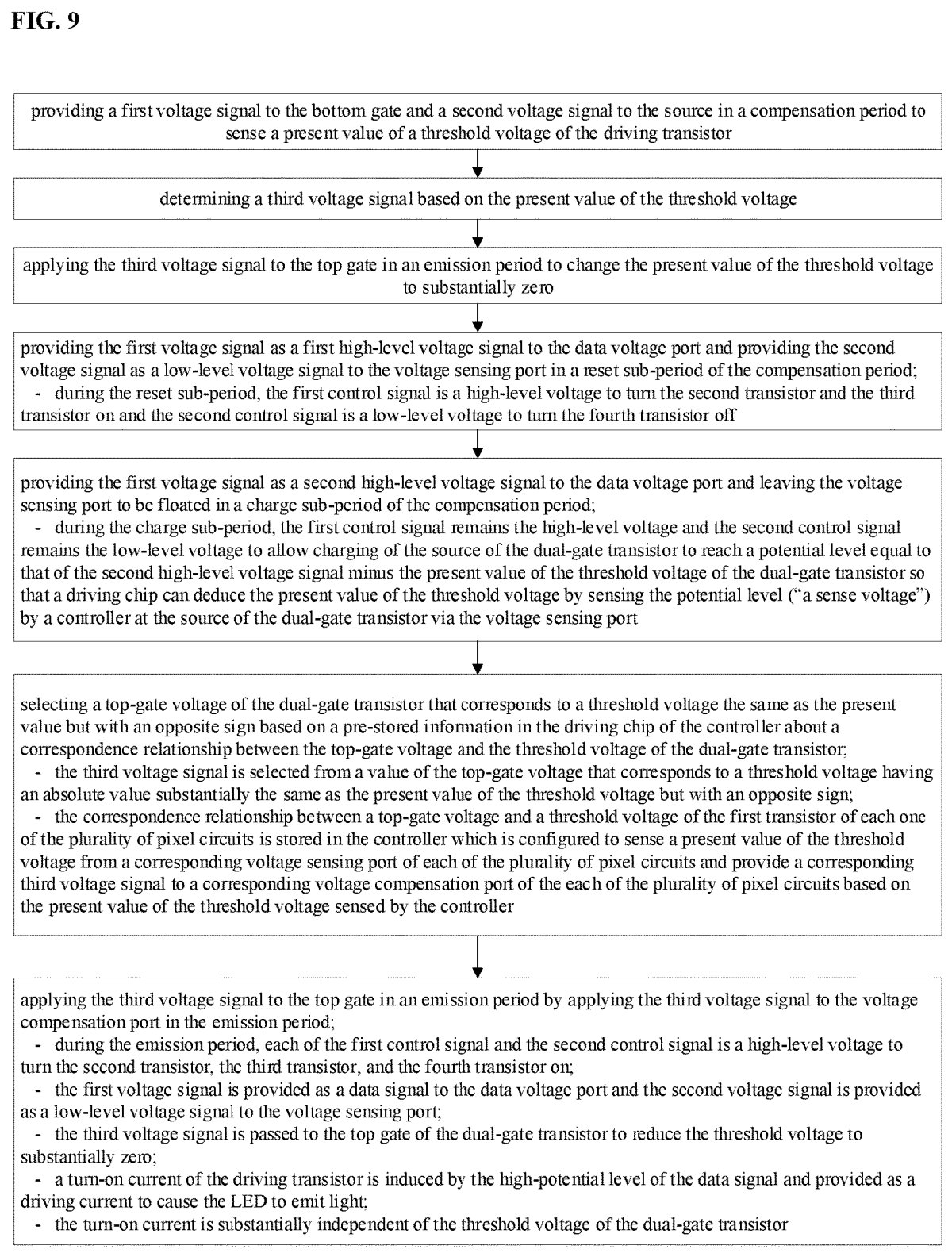

↓ determining a third voltage signal based on the present value of the threshold voltage

↓ applying the third voltage signal to the top gate in an emission period to change the present value of the threshold voltage to substantially zero

↓ providing the first voltage signal as a first high-level voltage signal to the data voltage port and providing the second voltage signal as a low-level voltage signal to the voltage sensing port in a reset sub-period of the compensation period;
- during the reset sub-period, the first control signal is a high-level voltage to turn the second transistor and the third transistor on and the second control signal is a low-level voltage to turn the fourth transistor off

↓ providing the first voltage signal as a second high-level voltage signal to the data voltage port and leaving the voltage sensing port to be floated in a charge sub-period of the compensation period;
- during the charge sub-period, the first control signal remains the high-level voltage and the second control signal remains the low-level voltage to allow charging of the source of the dual-gate transistor to reach a potential level equal to that of the second high-level voltage signal minus the present value of the threshold voltage of the dual-gate transistor so that a driving chip can deduce the present value of the threshold voltage by sensing the potential level ("a sense voltage") by a controller at the source of the dual-gate transistor via the voltage sensing port

↓ selecting a top-gate voltage of the dual-gate transistor that corresponds to a threshold voltage the same as the present value but with an opposite sign based on a pre-stored information in the driving chip of the controller about a correspondence relationship between the top-gate voltage and the threshold voltage of the dual-gate transistor;
- the third voltage signal is selected from a value of the top-gate voltage that corresponds to a threshold voltage having an absolute value substantially the same as the present value of the threshold voltage but with an opposite sign;
- the correspondence relationship between a top-gate voltage and a threshold voltage of the first transistor of each one of the plurality of pixel circuits is stored in the controller which is configured to sense a present value of the threshold voltage from a corresponding voltage sensing port of each of the plurality of pixel circuits and provide a corresponding third voltage signal to a corresponding voltage compensation port of the each of the plurality of pixel circuits based on the present value of the threshold voltage sensed by the controller

↓ applying the third voltage signal to the top gate in an emission period by applying the third voltage signal to the voltage compensation port in the emission period;
- during the emission period, each of the first control signal and the second control signal is a high-level voltage to turn the second transistor, the third transistor, and the fourth transistor on;
- the first voltage signal is provided as a data signal to the data voltage port and the second voltage signal is provided as a low-level voltage signal to the voltage sensing port;
- the third voltage signal is passed to the top gate of the dual-gate transistor to reduce the threshold voltage to substantially zero;
- a turn-on current of the driving transistor is induced by the high-potential level of the data signal and provided as a driving current to cause the LED to emit light;
- the turn-on current is substantially independent of the threshold voltage of the dual-gate transistor

PIXEL CIRCUIT, ACTIVE MATRIX ORGANIC LIGHT EMITTING DIODE DISPLAY PANEL, DISPLAY APPARATUS, AND METHOD OF COMPENSATING THRESHOLD VOLTAGE OF DRIVING TRANSISTOR

TECHNICAL FIELD

The present invention relates to display technology, more particularly, to a pixel circuit for an active matrix organic light emitting diode display panel and a method for threshold voltage non-uniformity compensation associated with the pixel circuit.

BACKGROUND

Organic light emitting diode (OLED) display apparatuses are self-emissive devices, and do not require backlights. OLED display apparatuses also provide more vivid colors and a larger color gamut as compared to the conventional liquid crystal display (LCD) apparatuses. Further, OLED display apparatuses can be made more flexible, thinner, and lighter than a typical LCD apparatus.

An OLED display apparatus typically includes an anode, an organic layer including a light emitting layer, and a cathode. OLEDs can be either a bottom-emission type OLED or a top-emission type OLED. In bottom-emission type OLEDs, the light is extracted from an anode side. In bottom-emission type OLEDs, the anode is generally transparent, while a cathode is generally reflective. In a top-emission type OLED, light is extracted from a cathode side. The cathode is optically transparent, while the anode is reflective.

SUMMARY

In an aspect, the present disclosure provides a pixel circuit in an active matrix organic light-emitting diode (AMOLED) display panel. The pixel circuit includes a first transistor comprising a bottom gate and a top gate, a drain supplied with a high-level power-supply voltage, and a source coupled to a light-emitting diode (LED). The bottom gate is provided with a first voltage signal and the source is provided with a second voltage signal in a compensation period during which a present value of a threshold voltage of the first transistor is sensed at the source and a third voltage signal is determined based on the present value of the threshold voltage. The top gate is configured to be provided with the third voltage signal in an emission period to reduce the present value of the threshold voltage.

Optionally, the LED is an organic light-emitting diode (OLED) comprising an anode coupled to the source of the first transistor and a cathode being supplied with a low-level power-supply voltage. The OLED is configured in the emission period to emit light induced by a driving current provided by the first transistor. The driving current is a turn-on current of the first transistor substantially independent of the threshold voltage.

Optionally, the pixel circuit further includes a second transistor comprising a source coupled to the bottom gate of the first transistor, a drain coupled to a data voltage port, and a gate controlled by a first control signal; a third transistor comprising a source coupled to the source of the first transistor, a drain coupled to a voltage sensing port, a gate controlled by the first control signal; a fourth transistor comprising a source coupled to the top gate of the first transistor, a drain coupled to a voltage compensation port, and a gate controlled by a second control signal; a first capacitor comprising a first electrode coupled to the bottom gate of the first transistor and a second electrode coupled to the source of the first transistor; and a second capacitor comprising a first electrode coupled to the drain of the first transistor and a second electrode coupled to the top gate of the first transistor.

Optionally, the first control signal is a high-level voltage to turn the second transistor and the third transistor on and the second control signal is a low-level voltage to keep the fourth transistor off in a reset sub-period of the compensation period. The first control signal remains to be the high-level voltage, the second control signal remains to be the low-level voltage in a charge sub-period of the compensation period subsequent to the reset sub-period.

Optionally, the data voltage port is configured to provide a first high-level voltage signal as the first voltage signal to set a high potential level at the bottom gate in the reset sub-period and the voltage sensing port is configured to provide the second voltage signal as a low-level voltage signal to set a low potential level at the source of the first transistor in the reset sub-period.

Optionally, the data voltage port is configured to provide a second high-level voltage signal as the first voltage signal in the charge sub-period. The voltage sensing port is configured to be floated by cutting off the second voltage signal in the charge sub-period. The high potential level at the bottom gate turns the first transistor on to allow the source of the first transistor is charged by the high-level power-supply voltage until a potential level of the source of the first transistor is equal to the high potential level at the bottom gate minus the present value of the threshold voltage of the first transistor.

Optionally, the voltage sensing port that is floated is used to detect the potential level at the source of the first transistor as a sensed voltage by a controller to deduce the present value of the threshold voltage based on the sensed voltage.

Optionally, the present value of the threshold voltage is used by the controller to determine the third voltage signal based on a pre-stored information about a correspondence relationship between a top-gate voltage and a threshold voltage of the first transistor. The third voltage signal is selected from a value of the top-gate voltage that corresponds to a threshold voltage having an absolute value substantially the same as the present value of the threshold voltage but with opposite sign.

Optionally, the first control signal is a high-level voltage to turn on the second transistor to allow the first voltage signal as a data signal to be applied from the data voltage port to the bottom gate and turn on the third transistor to allow the second voltage signal as a low-level voltage signal to be applied from the voltage sensing port to the source of the first transistor in the emission period. The second control signal is a high-level voltage to turn on the fourth transistor to allow the third voltage signal to be applied via the voltage compensation port to the top gate, thereby resulting in a changed value of threshold voltage to be substantially zero. A turn-on current of the first transistor is provided to the LED as a light-emitting driving current substantially independent of the changed value of threshold voltage.

Optionally, the turn-on current through the first transistor is substantially independent of the low-level power-supply voltage supplied to the cathode of the LED.

Optionally, the pixel circuit is one of a plurality of pixel circuits in the AMOLED display panel. The correspondence relationship between a top-gate voltage and a threshold voltage of the first transistor of each one of the plurality of pixel circuits is stored in the controller which is configured to sense a present value of the threshold voltage from a corresponding voltage sensing port of each of the plurality of pixel circuits and provide a corresponding third voltage signal to a corresponding voltage compensation port of the each of the plurality of pixel circuits based on the present value of the threshold voltage sensed by the controller.

Optionally, the compensation period is followed by a holding period before the emission period starts, during the holding period the first voltage signal and the second voltage signal are provided with low-level voltages.

In another aspect, the present disclosure provides an active matrix organic light emitting diode (AMOLED) display panel comprising a matrix of pixel circuits. Each pixel circuit in the matrix includes a first transistor comprising a bottom gate and a top gate, a drain supplied with a high-level power-supply voltage, and a source coupled to a light emitting diode (LED). The bottom gate is provided with a first voltage signal and the source is provided with a second voltage signal in a compensation period during which a present value of a threshold voltage of the first transistor is sensed at the source and a third voltage signal is determined based on the present value of the threshold voltage. The top gate is configured to be provided with the third voltage signal in an emission period to reduce the present value of the threshold voltage. The LED is an organic light-emitting diode comprising an anode coupled to the source of the first transistor and a cathode being supplied with a low-level power-supply voltage, the LED being configured in the emission period to emit light induced by a driving current provided by the first transistor that is a turn-on current substantially independent of the threshold voltage.

Optionally, each pixel circuit in the matrix further includes a second transistor comprising a source coupled to the bottom gate of the first transistor, a drain coupled to a data voltage port, and a gate controlled by a first control signal; a third transistor comprising a source coupled to the source of the first transistor, a drain coupled to a voltage sensing port, a gate controlled by the first control signal; a fourth transistor comprising a source coupled to the top gate of the first transistor, a drain coupled to a voltage compensation port, and a gate controlled by a second control signal; a first capacitor comprising a first electrode coupled to the bottom gate of the first transistor and a second electrode coupled to the source of the first transistor; and a second capacitor comprising a first electrode coupled to the drain of the first transistor and a second electrode coupled to the top gate of the first transistor.

Optionally, each of pixel circuits receives the first voltage signal from the data voltage port and the second voltage signal from the voltage sensing port in the compensation period to allow the present value of the threshold voltage of the first transistor to be deduced from a sense voltage detected via the voltage sensing port by a controller to determine a corresponding value for the third voltage signal to be applied to the voltage compensation port in the emission period.

Optionally, the controller is configured to pre-store a correspondence relationship between a top-gate voltage and a threshold voltage of the first transistor of each pixel circuit in the matrix and to determine the third voltage signal individually for each pixel circuit in the compensation period based on the present value of the threshold voltage deduced individually for each pixel circuit.

Optionally, the controller is further configured to apply the third voltage signal in the emission period to the top gate of the first transistor via the corresponding voltage compensation port of a corresponding pixel circuit to change the threshold voltage of the first transistor of the corresponding pixel circuit to substantially zero.

In yet another aspect, the present disclosure provides a display apparatus including an AMOLED display panel described herein and a controller coupled to the AMOLED display panel and configured to pre-store a correspondence relationship between a top-gate voltage and a threshold voltage of the first transistor of each pixel circuit in the matrix. The controller is further configured to determine the third voltage signal individually for each pixel circuit in the compensation period based on the present value of the threshold voltage deduced individually for each pixel circuit. The controller also is configured to apply the third voltage signal in the emission period to the top gate of the first transistor via the corresponding voltage compensation port of a corresponding pixel circuit to reduce the threshold voltage of the first transistor of each pixel circuit.

In still another aspect, the present disclosure provides a method of compensating a threshold voltage of a driving transistor of a pixel circuit of an AMOLED display panel. The method includes providing a dual-gate transistor as the driving transistor in the pixel circuit. The dual-gate transistor includes a bottom gate and a top gate. The method further includes providing a first voltage signal to the bottom gate and a second voltage signal to the source in a compensation period to sense a present value of a threshold voltage of the driving transistor. Additionally, the method includes determining a third voltage signal based on the present value of the threshold voltage. Furthermore, the method includes applying the third voltage signal to the top gate in an emission period of the operation timing to change the present value of the threshold voltage to proximately zero.

Optionally, the method of providing the first voltage signal to the bottom gate and the second voltage signal to the source in the compensation period includes providing a first high-level voltage signal as the first voltage signal to the data voltage port and providing a low-level voltage signal as the second voltage signal to the voltage sensing port in a reset sub-period of the compensation period, during which the first control signal is a high-level voltage to turn the second transistor and the third transistor on and the second control signal is a low-level voltage to turn the fourth transistor off.

Optionally, the method of providing the first voltage signal to the bottom gate and the second voltage signal to the source in the compensation period further includes providing a second high-level voltage signal as the first voltage signal to the data voltage port and leaving the voltage sensing port to be floated in a charge sub-period of the compensation period, during which the first control signal remains the high-level voltage and the second control signal remains the low-level voltage to allow charging of the source of the dual-gate transistor to reach a potential level equal to that of the second high-level voltage signal minus the present value of the threshold voltage of the dual-gate transistor so that a driving chip can deduce the present value of the threshold voltage by sensing the potential level at the source of the dual-gate transistor via the voltage sensing port.

Optionally, the method of determining the third voltage signal includes selecting a top-gate voltage of the dual-gate transistor that corresponds to a threshold voltage the same as the present value but with an opposite sign based on a correspondence relationship between the top-gate voltage and the threshold voltage of the dual-gate transistor pre-stored in the driving chip.

Optionally, the method of applying the third voltage signal to the top gate in an emission period comprises applying the third voltage signal to the voltage compensation port in the emission period during which each of the first control signal and the second control signal is a high-level voltage to turn the second transistor, the third transistor, and the fourth transistor on, the first voltage signal is provided as a data signal to the data voltage port and the second voltage signal is provided as a low-level voltage signal to the voltage sensing port. The third voltage signal is passed to the top gate of the dual-gate transistor to reduce the threshold voltage and a turn-on current of the driving transistor is induced by high-potential level of the data signal and provided as a driving current to cause the LED to emit light. The turn-on current is substantially independent of the threshold voltage of the dual-gate transistor.

BRIEF DESCRIPTION OF THE FIGURES

The following drawings are merely examples for illustrative purposes according to various disclosed embodiments and are not intended to limit the scope of the present disclosure.

FIG. 9 is a flow chart illustrating a threshold voltage compensation method according to some alternative embodiments of the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Typical AMOLED display panels use thin-film transistor (TFT) to construct the pixel circuits to provide driving current for the organic light-emitting diodes (OLED). The TFTs in the pixel circuits usually are low-temperature polysilicon thin-film transistors (LTPS TFT) or oxide thin-film transistor (Oxide TFT). Both LTPS TFT and Oxide TFT have a higher mobility and more stable characteristics compared to the amorphous-Si TFT, and thus is more suitable to be used in an AMOLED display. However, due to the limitation of the crystallization process, LTPS TFTs, which are manufactured on a large glass substrate, have non-uniformity in electrical parameters such as threshold voltage, mobility, etc., and such non-uniformity may result in variances of current and luminance of OLED which can be perceived by human eyes, i.e., Mura phenomenon. Oxide TFTs can be made with much better uniformity on large area substrate. But after long-time operation driven by voltages and under high temperature, the threshold voltages of the Oxide TFTs drift. In a large area display panel, different TFTs at different locations have different drifts of threshold voltages due to variations of a displayed image at different pixels, causing variations in display intensities. Because of this type of variations is related to a previously displayed image, it results in an image blur phenomenon.

In a large size display application, there is a certain resistance in the power cord of the backboard, and all of pixels are provided with driving current by the positive power supply (ARVDD) of the backboard, so the supply voltage in the area near the location of the power supply ARVDD is higher than that in the area located far from the location of the power supply ARVDD, and such phenomenon is called IR Drop. As the current of OLED depends on the voltage of ARVDD, IR Drop also results in variances of current in different areas, and Mura phenomenon in turn occurs in display.

Moreover, there is also the non-uniformity in electrical parameters due to the non-evenness of the film thickness generated when OLED device is evaporated. For forming pixel circuits with either amorphous-Si or oxide based N-type TFT, a storage capacitor is used to be coupled between a gate electrode of a driving TFT and an anode of OLED. When data voltage signal is transmitted to the gate electrode, the actual gate-to-source voltage Vgs applied on the driving TFT is different if the anode voltage of OLED of each pixel circuit is different. This causes different driving currents in different OLED which in turn cause different display intensities among different pixels.

Figure 1:
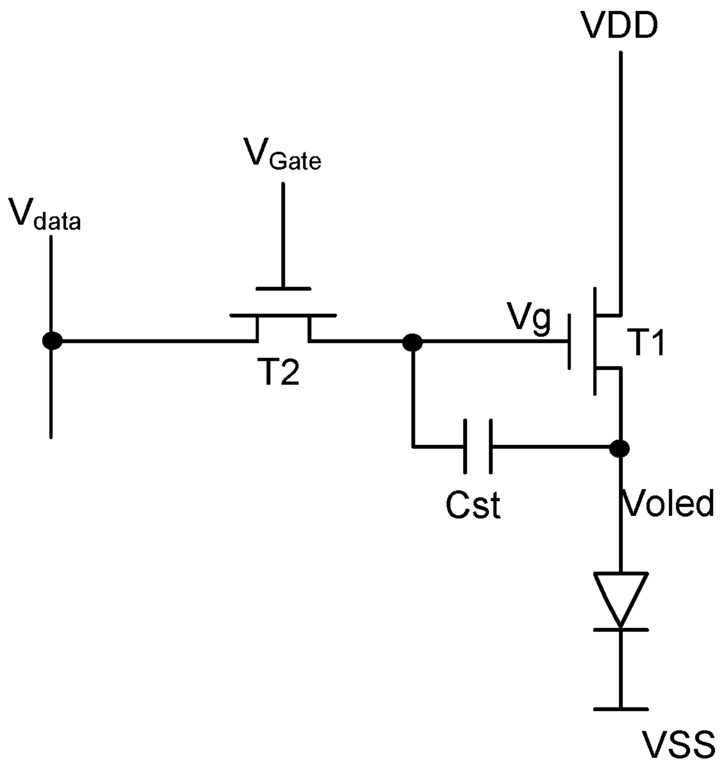
FIG. 1 Related Art
FIG. 1 is a conventional 2T1C pixel circuit for driving an organic light-emitting diode for light emission.

Voltage programming pixel-driving method for AMOLED pixel circuit is commonly used which is similar to traditional AMLCD pixel-driving method. A driving chip (integrated circuit) provides a gray-scale voltage signal which can be transformed to a gray-scale current signal of the driving TFT within the pixel circuit to drive the OLED light emission to achieve gray-scale intensity. This pixel-driving method has been widely used because of attributes such as fast driving speed, simple structure, and suitability for large size panel, etc. FIG. 1 is a conventional 2T1C pixel circuit for driving an organic light-emitting diode for light emission. In the pixel circuit, a switching transistor T2 is controlled to pass data voltage from a data line to a gate of a driving transistor T1. The driving transistor T1 converts this data voltage into a corresponding driving current for the OLED device. In normal working mode, the driving transistor T1 is in saturation state to provide stable driving current for the OLED device within a time period for scanning one line of image. The driving current can be expressed as $$I_{OLED} = \frac{1}{2}\mu_n \cdot C_{ox} \cdot \frac{W}{L} \cdot (V_{data} - V_{OLED} - V_{thn})^2$$

where $m_n$ is carrier mobility, Cox is gate oxide layer capacitance, W/L is width to length ratio of the driving transistor, $V_{data}$ is data signal voltage. $V_{OLED}$ is OLED working voltage shared by all pixel circuits. $V_{thn}$ is a threshold voltage of the driving transistor which has a positive value for an enhanced type TFT and a negative value for depletion type TFT. Based on the above expression of the driving current associated with the 2T1C pixel circuit, the driving current may be different in different pixel circuit if the threshold voltage $V_{thn}$ is different. As the threshold voltage of the driving transistor associated with the pixel circuit drifts with time, it causes different driving current to change with time, which in turn causes image blur phenomenon. Therefore, the 2T1C pixel circuit needs to add extra TFTs and capacitors to design a circuit with a compensation function for compensating the TFT non-uniformity and OLED non-uniformity.

Because of non-uniformity of TFT threshold voltages and OLED devices, pixel circuits of AMOLED display panels need to implement a compensation mechanism in one way or another to correct either the Mura phenomenon or Blur phenomenon, especially for large sized display panel. A conventional pixel circuit with 3T1C structure for compensating TFT threshold voltage drift includes a driving transistor T1, a switching transistor T2, and a sensing transistor T3, one storage capacitor Cst, a first power line for supplying a high-potential voltage VDD, a second power line for supplying a low-potential voltage VSS (lower than the high-potential voltage VDD), a reference line for supplying a reference voltage $V_{sense}$ which is lower than the high-potential voltage VDD and higher than the low-potential voltage VSS. The switching transistor T2 is controlled by a gate-driving signal $V_{data}$ applied to the gate node, and is electrically connected between a node N1 of the driving transistor T1 and a data line. The storage capacitor Cst, connected between the node N1 and a node N2, serves to maintain a predetermined voltage for a one-frame time. The sensing transistor T3 is controlled by the gate-driving signal $V_{data}$ applied to the gate node to apply a reference voltage $V_{sense}$ supplied through the reference voltage line to the second node N2 (e.g. the source node of the driving transistor T1) and also allow a driving chip connected to the reference voltage line to sense the voltage at the node N2. Based on this circuit structure, a sensing driving operation of the AMOLED pixel circuit is performed in three periods of time: a sensing period, a compensation period, and an emission period to achieve a compensation of the threshold voltage of the driving transistor so that the driving current of OLED device is substantially independent of the threshold voltage. However, compensation of the threshold voltage using the sensing driving operation based on the above 3T1C pixel circuit is limited by a certain range of the threshold voltage. If the drift of the threshold voltage becomes too large during working process of the AMOLED display panel, the value of threshold voltage may surpass the certain range so that the drift of the threshold voltage may not be fully compensated. In other words, the compensation accuracy for some pixel circuits will be lowered, leading to poor effect on correcting non-uniformities in TFT threshold voltages of large AMOLED display panel.

Accordingly, the present invention provides, inter alia, a pixel circuit, an AMOLED display panel and a display apparatus having the same, and a pixel-driving method thereof that substantially obviate one or more of the problems due to limitations and disadvantages of the related art.

In one aspect, the present disclosure provides a pixel circuit of an AMOLED display panel that is capable of controlling the drift of threshold voltage of the driving transistor. Both the drift direction and drift value can be controlled so that the non-uniformity issue due to large drift of threshold voltage of the driving transistor can be substantially eliminated.

Figure 2:
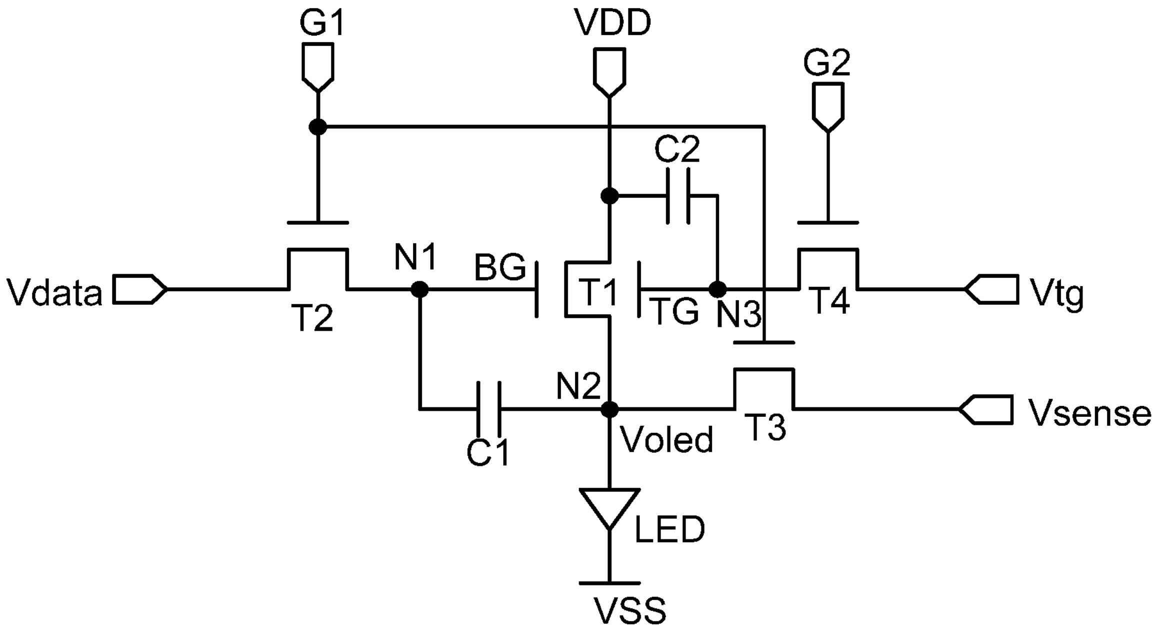
FIG. 2 is a pixel circuit for driving an organic light-emitting diode for light emission according to some embodiments of the present disclosure.

FIG. 2 is a pixel circuit for driving an organic light-emitting diode for light emission according to some embodiments of the present disclosure. Referring to FIG. 2, this pixel circuit is based on a 4T2C structure. The first transistor T1 is a driving transistor for providing a light-emission driving current for a light-emitting diode (LED) of the pixel circuit. The LED is an organic light-emitting diode (OLED). T1 has a drain coupled to a high-level power-supply voltage VDD and a source coupled to node N2. In an embodiment, T1 is a dual-gate transistor having a bottom gate BG coupled to node N1 and a top gate TG coupled to node N3. The second transistor T2 is a switching transistor having a gate controlled by a first control signal G1, which can be a gate-driving signal generated by a gate driver circuit, a drain coupled to a data voltage port configured to be supplied with a first voltage signal $V_{data}$ (from a data line of the AMOLED display panel), and a source coupled to the node N1. The third transistor T3 is a sensing transistor having a gate controlled also by the first control signal G1, a source coupled to the node N2, and a drain coupled to a voltage sensing port configured to be supplied with a second voltage signal $V_{sense}$. The fourth transistor T4 is a controlling transistor, also a switching transistor, having a gate controlled by a second control signal G2, a source coupled to the node N3 which is connected to the top gate TG of the driving transistor T1, and a drain coupled to a voltage compensation port configured to be supplied with a third voltage signal Vtg. Optionally, all the transistors above can be n-channel type thin-film transistors. In additional, the pixel circuit includes a first capacitor C1 having a first electrode coupled to the node N1 and a second electrode coupled to the node N2. Further, the pixel circuit includes a second capacitor C2 having a first electrode coupled to the drain of the driving transistor T1 and a second electrode coupled to the node N3 which is connected to the top gate TG of the driving transistor T1.

Figure 4:
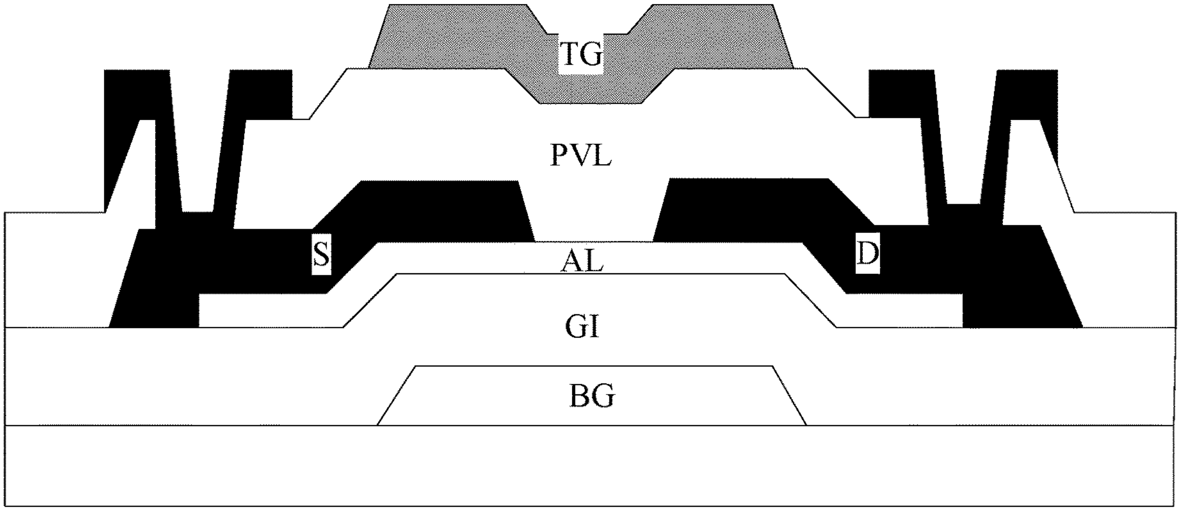
FIG. 4 is an exemplary structural diagram of a dual-gate thin-film transistor according to some embodiments of the present disclosure.

FIG. 4 is an exemplary structural diagram of a dual-gate thin-film transistor according to some embodiments of the present disclosure. Referring to FIG. 4, the dual-gate thin-film transistor in some embodiments includes a bottom gate BG, a gate insulating layer GI on the bottom gate BG, an active layer AL on a side of the gate insulating layer GI distal to the bottom gate BG, a source electrode S and a drain electrode D on a side of the active layer AL distal to the gate insulating layer GI, a passivation layer PVL on a side of the source electrode S, the drain electrode D, and the active layer AL distal to the gate insulating layer GI, and a top gate TG on a side of the passivation layer PVL distal to the active layer AL.

In some embodiments, the driving transistor T1 provided with a dual-gate transistor, the switching transistor T2, and the sensing transistor T3 plus the first capacitor C1 as a part of the present pixel circuit provide a function of compensating a drift of the threshold voltage of the driving transistor T1 during normal work condition of the driving transistor by providing a driving current for the OLED in an emission period to be substantially independent of the threshold voltage. The bottom gate BG of the dual-gate transistor is controlled by the switching transistor T2. The top gate TG of the dual-gate transistor is controlled by the controlling transistor T4 to tune its potential level so that the threshold voltage of the driving transistor T1 can be controlled. In particular, both an absolute value and a sign of the threshold voltage can be controlled since by applying different top-gate voltages to the top gate of the dual-gate transistor the threshold voltage thereof can be effectively changed from a positive value to a negative value or vice versa (as shown in an example in FIG. 5). Optionally, the value of the threshold voltage can be controlled to proximity of zero if a proper top-gate voltage is applied. Since the (fourth) controlling transistor T4 is substantially independent of rest circuit structure, the control of the threshold voltage is also not depended upon the function of compensation. By controlling a value of the threshold voltage to a limited range, particularly in proximity of zero, makes the pixel circuit to perform the function of compensation more accurately to ensure that the driving current provided to the LED of the pixel circuit is substantially independent of the threshold voltage of the driving transistor. Thus, non-uniformity issue caused by incomplete or inaccurate compensation due to extra-large drift of the threshold voltage is solved.

In some embodiments, the first capacitor C1 is directly coupled between the bottom gate BG (i.e., the node N1) and the source of driving transistor T1 (i.e., the node N2) as a storage capacitor to provide sufficient capacitance for stabilizing a potential level difference Vgs between the gate and the source of the driving transistor T1. In some embodiments, the second capacitor C2 is directly coupled between the drain and the top gate TG of the driving transistor T1 to provide a sufficient capacitance for stabilizing a potential level at the top gate TG after it is charged from the voltage compensation port by the third voltage signal Vtg.

Figure 3:
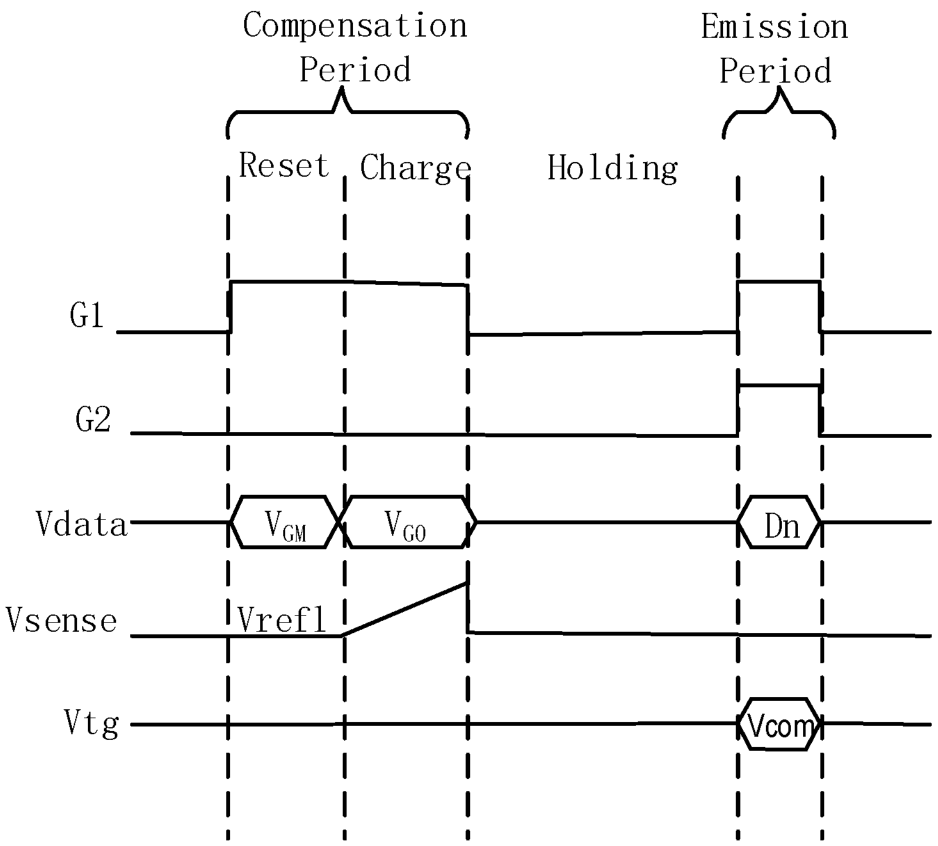
FIG. 3 is a timing diagram of operating the pixel circuit of FIG. 2 according to some embodiments of the present disclosure.

FIG. 3 is a timing diagram of operating the pixel circuit of FIG. 2 according to some embodiments of the present disclosure. Referring to FIG. 3, the timing diagram shows at least one cycle for operating the pixel circuit of FIG. 2, including at least a compensation period and an emission period, separated by a holding period for a controller to accordingly provide multiple programmed voltage signals to operate the pixel circuit. The controller is configured to provide these programmed voltage signals for each of every pixel circuit in the AMOLED display panel. In some embodiments, the programmed voltage signals include at least a first voltage signal provided to the data voltage port coupled to the drain of the second transistor T2, a second voltage signal provided to the voltage sensing port coupled to the drain of the third transistor T3, and a third voltage signal provided to the voltage compensation port coupled to the drain of the fourth transistor T4. The first and second control signals G1 and G2 are also provided, or may be generated by a gate driver circuit controlled by the controller, to separately turn on or off the second transistor T2, the third transistor T3, and the fourth transistor T4.

The operation of the pixel circuit can be executed for at least one cycle per pixel (of driving the OLED of the pixel to emit light). The compensation period of each cycle includes a reset sub-period followed by a charge sub-period. In the reset sub-period, the first control signal G1 is a high-level voltage sufficient to turn on the second transistor T2 and also turn on the third transistor T3. The second control signal G2 is a low-level voltage to turn the fourth transistor T4 off. The first voltage signal $V_{data}$ is provided, by the controller, as a first high-level voltage signal $V_{GM}$ supplied to the data voltage port. The second transistor T2 is turned on to pass the first high-level voltage signal to the node N1 which is the bottom gate BG of the driving transistor T1. Optionally, the first high-level voltage signal can be sufficiently high to turn the driving transistor T1 on. At the reset sub-period, the second voltage signal $V_{sense}$ is provided, also by the controller, as a low-level voltage signal $V_{refl}$ to the voltage sensing port and passed to the node N2 which is the source of the driving transistor T1 as the third transistor T3 is turned on. In the reset sub-period, the third voltage signal Vtg is set off and the fourth transistor is turned off by the second control signal G2 set at the low-level voltage. The potential levels at both sides of the first capacitor C1 are set and prepared for the next charge sub-period. The potential level $V_{OLED}$ at the anode of the OLED is low so that no light is emitted.

Referring to FIG. 3, in the charge sub-period subsequent to the reset sub-period, both the first and the second control signals G1 and G2 remains the same as in last sub-period to keep the states of the second transistor T2, the third transistor T3, and the fourth transistor T4 the same. The first voltage signal $V_{data}$ is provided by the controller as a second high-level voltage signal $V_{G0}$ supplied to the data voltage port and passed to the bottom gate BG of the driving transistor T1 to keep it on. At the same time, the voltage sensing port is firstly cut off from the second voltage signal so that it is floated which makes the source of the driving transistor floated with the low potential level at the $V_{refl}$ set in last reset sub-period. The high potential level $V_{G0}$ at the bottom gate BG (or node N1) keeps the driving transistor T1 on to allow charging of the source from its drain that is supplied with the high-level power-supply voltage VDD. The charging is continued until the potential level of the source reaches a potential level equal to $V_{G0}-V_{th}$, where $V_{th}$ is a present value of the driving transistor T1. During the same time, the voltage sensing port can be used by the controller to sense the change of potential level at the source of the driving transistor as the third transistor is turned on. By obtaining a sense voltage that equals to $V_{G0}-V_{th}$, the controller is able to deduce the present value of the threshold voltage of the driving transistor T1. The potential level at the anode of the OLED is still controlled to be a low-level so that no light is emitted.

Figure 5:
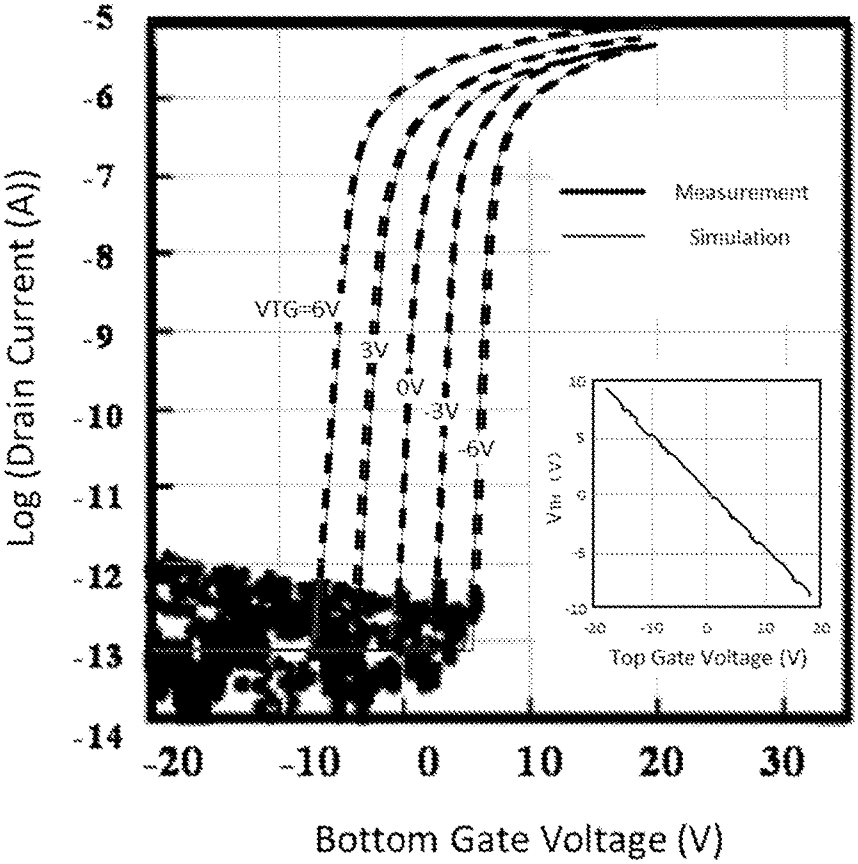
FIG. 5 is an exemplary plot of measurement of drain current versus bottom-gate voltage of the dual-gate transistor under different top-gate voltage according to some embodiments of the present disclosure.

In some embodiments, the controller is configured to be a driving chip disposed along with the AMOLED display panel. Whenever an AMOLED display panel finishes its process of laying out all those thin-film transistors (TFTs) on a glass substrate to form a matrix of pixel circuits, each of the TFTs is subjected to multiple IV tests. At least for each driving transistor, which is a dual-gate transistor having a top gate and a bottom gate configured as shown in FIG. 4, the IV test is to measure its drain current varying with the bottom-gate voltage, e.g., from −20V to +20V or others, under different top-gate voltages, e.g., ranging from −6V to +6V or others. FIG. 5 shows an example of such IV test measurement results. Based on these IV tests, a correspondence relationship between the top-gate voltage and the threshold voltage for each driving transistor in each individual pixel circuit can be deduced. For example, referring to FIG. 5, for the top-gate voltage of −6V the threshold voltage $V_{th}$ of the transistor is about 6V, for the top-gate voltage of 0V, the threshold voltage $V_{th}$ is about 0V, and for the top-gate voltage of +6V the threshold voltage is about −6V. In general, a look-up table for a correspondence relationship (e.g., a one-to-one correspondence relationship) between the top-gate voltage and the threshold voltage can be individually generated for each driving transistor with pixel location ID on the display panel and stored in a memory of the driving chip. Now, during image display operation of the AMOLED display panel, the controller receives the present value of the threshold voltage of the driving transistor of a particular pixel circuit by sensing the potential level at the source of the driving transistor at an end of a charge sub-period of a compensation period. The controller then can compare the present value of the threshold voltage with the look-up table stored in the memory for the driving transistor of the same particular pixel circuit. A top-gate voltage can be selected out of the look-up table if the top-gate voltage corresponds to a threshold voltage of an absolute value the same as the present value of the threshold voltage but with an opposite sign. For example, if the present value of the threshold voltage sensed by the controller is 3V, the top-gate voltage that corresponds to a threshold voltage of −3V is selected. In another example, if the present value of the threshold voltage sensed by the controller is −4V, the top-gate voltage that corresponds to a threshold voltage of +4V is selected. If the selected top-gate voltage is applied to the top gate of the dual-gate transistor, this top-gate voltage is able to reduce the present value of the threshold voltage. In particular, the top-gate voltage changes the threshold voltage from the present value to substantially zero based on the structural configuration of the dual-gate transistor (see FIG. 4). In an embodiment, the controller is configured to determine the third voltage signal to be the selected top-gate voltage (both in value and sign) and apply the third voltage signal to the voltage compensation port of the corresponding pixel circuit to reduce the present value of the threshold voltage of the driving transistor in an emission period.

Referring to FIG. 3, in the emission period, both the first and the second control signals G1 and G2 are high-level voltages to turn transistors T2, T3, and T4 on. The first voltage signal $V_{data}$ is provided by the controller as a data signal Dn to the data voltage port and passed to the bottom gate BG of the driving transistor T1. The second voltage signal $V_{sense}$ is provided by the controller as low-level voltage $V_{refl}$ to the voltage sensing port and passed to the source of the driving transistor or the anode of the OLED so that $V_{OLED}=V_{refl}$. The third voltage signal Vtg is provided by the controller to the voltage compensation port as a compensation voltage $V_{com}$ at a level selected according to the description above, which can be a positive, zero, or negative value depending on the sensed present value of the threshold voltage. The compensation voltage $V_{com}$ is passed to the top gate TG of the driving transistor T1 since the fourth transistor T4 is turned on. Now, the top gate TG of the driving transistor, which is a dual-gate transistor, is applied with the compensation voltage $V_{com}$ so that the present value of the threshold voltage of the driving transistor can be reduced. Optionally, the present value of the threshold voltage of the driving transistor is changed to substantially zero. All other voltage signal settings and the pixel circuitry itself are substantially the same as the pixel circuit to perform its function of compensation for the threshold voltage except that the present value of threshold voltage of the driving transistor is a reduced value. Optionally, the present value of threshold voltage of the driving transistor is at least in a very small range around zero. Therefore, the compensation of the threshold voltage can be done accurately by the pixel circuit to provide a driving current completely independent of the threshold voltage to make the OLED emitting light based on solely the supplied data signal Dn without the Mura or Blur phenomenon.

Referring to FIG. 3 again, before starting the emission period, a holding period may be included after the compensation period. Since the charging of the source of the driving transistor is relatively slow, the controller may need extra time to measure the sense voltage to be equal to $V_{G0}-V_{th}$ and process the sense voltage with the pre-stored look-up table of a correspondence relationship (e.g., a one-to-one correspondence relationship) between a top-gate voltage and a threshold voltage to determine a particular top-gate voltage to be a compensation voltage. During the holding period, all the voltage signals and gate-driving signals are set to low-level to make the pixel circuit in a non-active mode and wait for the controller to provide the compensation voltage in next cycle to reduce the absolute value of the threshold voltage and perform accurate compensation to make the driving current in the emission period substantially independent of the (reduced) absolute value of the threshold voltage.

In another embodiment, since the driving current is only depended on the voltage levels at the bottom gate BG and the source N2 respectively set to be the $V_{data}$ from the first voltage signal and the $V_{refl}$ from the second voltage signal, which are completely independent of the low-level power-supply voltage VSS supplied to the cathode of the OLED device, the driving current then is also substantially free of impact of any variation in the low-level power-supply voltage VSS. Therefore, the pixel circuit of FIG. 2 also has a function of compensating the ground bouncing effect at the cathode of OLED.

Figure 6:
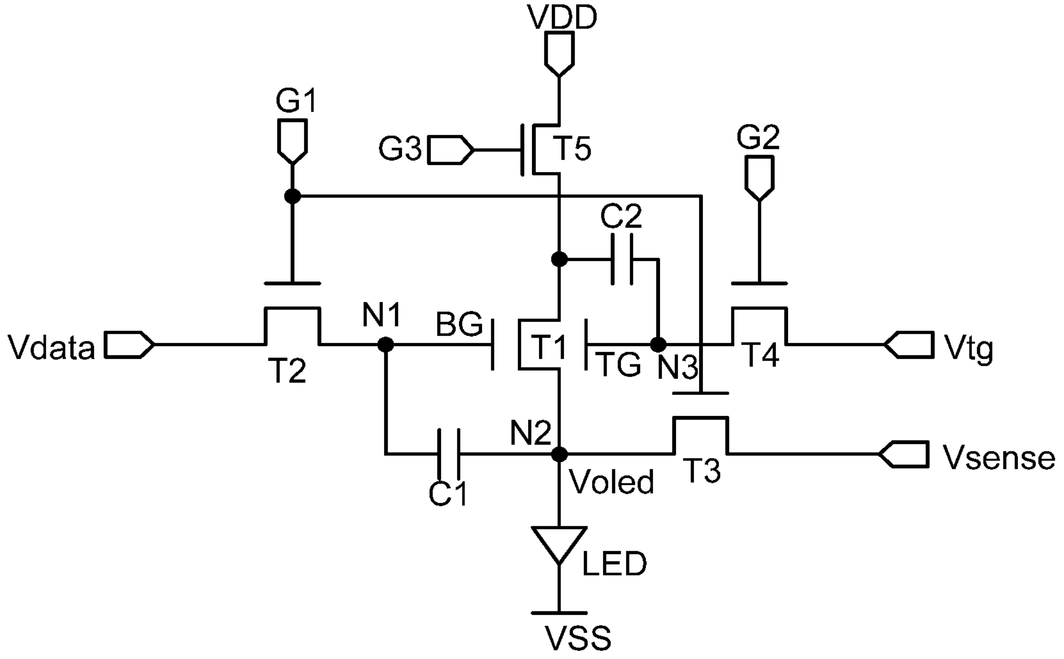
FIG. 6 is a pixel circuit for driving an organic light-emitting diode for light emission according to some alternative embodiments of the present disclosure.

FIG. 6 is a pixel circuit for driving an organic light-emitting diode for light emission according to some alternative embodiments of the present disclosure. Referring to FIG. 6, this pixel circuit is based on a 5T2C structure. The first transistor T1 is a driving transistor for providing a light-emission driving current for a light-emitting diode (LED) of the pixel circuit. The LED is an organic light-emitting diode (OLED). T1 has a drain coupled to a source of a fifth transistor T5 and a source coupled to node N2. In particular, T1 is a dual-gate transistor having a bottom gate BG coupled to node N1 and a top gate TG coupled to node N3. The second transistor T2 is a switching transistor having a gate controlled by a first control signal G1, which can be a gate-driving signal generated by a gate driver circuit, a drain coupled to a data voltage port configured to be supplied with a first voltage signal $V_{data}$ (from a data line of the AMOLED display panel), and a source coupled to the node N1. The third transistor T3 is a sensing transistor having a gate controlled also by the first control signal G1, a source coupled to the node N2, and a drain coupled to a voltage sensing port configured to be supplied with a second voltage signal $V_{sense}$. The fourth transistor T4 is a controlling transistor, also a switching transistor, having a gate controlled by a second control signal G2, a source coupled to the node N3 which is connected to the top gate TG of the driving transistor T1, and a drain coupled to a voltage compensation port configured to be supplied with a third voltage signal Vtg. Back to the fifth transistor T5, it also has a gate being controlled by a third control signal G3 and a drain coupled to a high-level power-supply voltage VDD. Optionally, all the transistors above can be n-channel type thin-film transistors. In additional, the pixel circuit includes a first capacitor C1 having a first electrode coupled to the node N1 and a second electrode coupled to the node N2. Further, the pixel circuit includes a second capacitor C2 having a first electrode coupled to the drain of the driving transistor T1 and a second electrode coupled to the node N3 which is connected to the top gate TG of the driving transistor T1. The 5T2C pixel circuit is similar to the 4T2C pixel circuit shown in FIG. 2 except adding a fifth transistor T5 for controlling the connection between the drain of T1 and the high-level power-supply voltage VDD.

Figure 7:
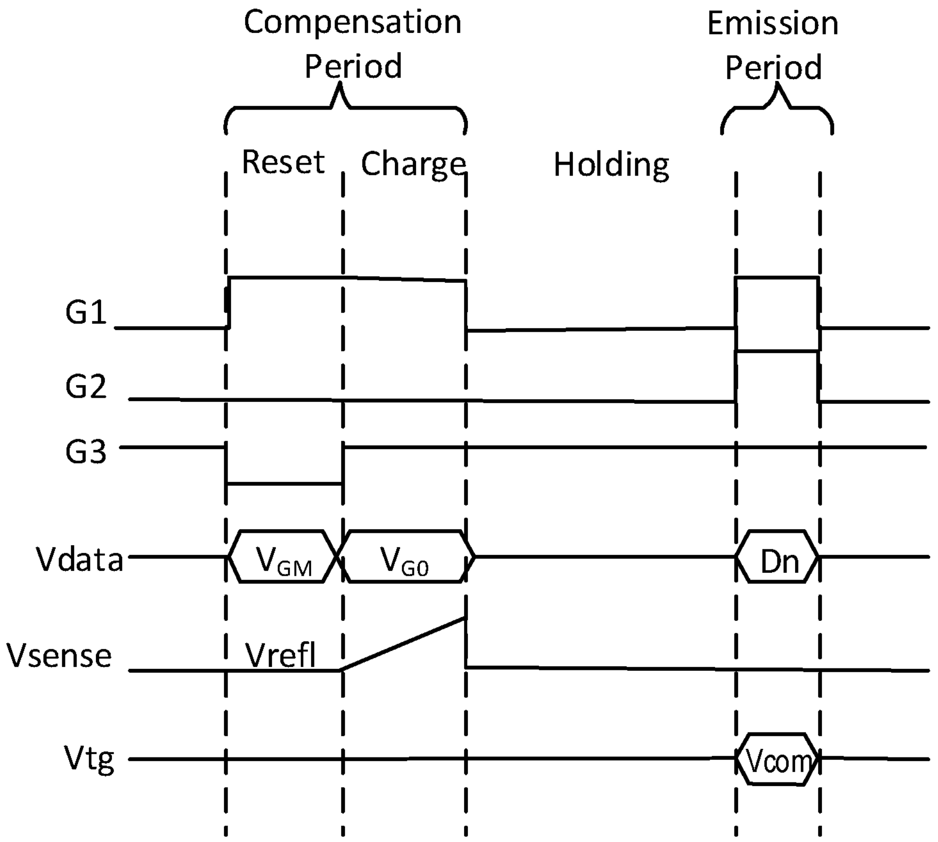
FIG. 7 is a timing diagram of operating the pixel circuit of FIG. 6 according to some alternative embodiments of the present disclosure.

FIG. 7 is a timing diagram of operating the pixel circuit of FIG. 6 according to some alternative embodiments of the present disclosure. Referring to FIG. 7, the timing diagram shows at least one cycle for operating the pixel circuit of FIG. 6, including at least a compensation period and an emission period, separated by a holding period for a controller to accordingly provide multiple programmed voltage signals to operate the pixel circuit. The controller is configured to provide these programmed voltage signals for every pixel circuit in the AMOLED display panel. In some embodiments, the programmed voltage signals include at least a first voltage signal provided to the data voltage port coupled to the drain of the second transistor T2, a second voltage signal provided to the voltage sensing port coupled to the drain of the third transistor T3, and a third voltage signal provided to the voltage compensation port coupled to the drain of the fourth transistor T4. Three control signals G1, G2, and G3 are also provided, or may be generated by a gate driver circuit controlled by the controller, to separately turn on or off the second transistor T2, the third transistor T3, the fourth transistor T4, and the fifth transistor T5.

Referring to FIG. 7 and FIG. 3, the timing control for the 5T2C pixel circuit of FIG. 6 is similar except that an third control signal G3 is implemented to turn on or off the fifth transistor T5. In particular, during the reset sub-period of the compensation period, G3 is a low-level voltage signal which turns off the fifth transistor T5. This effectively turns off any charging effect from VDD to the node N2, i.e., the anode of the OLED, so that the potential level $V_{OLED}$ can be accurately reset to that defined by the voltage signal $V_{sense}$ which is provided as a low-level voltage $V_{ref1}$ by the controller. This ensures that the charging of VDD to the node N2 during next charge sub-period can be started from a proper potential level at both the node N1 and node N2. The third control signal G3 is a high-level voltage signal in other periods. G3 turns on the transistor T5 to connect the VDD to the drain of the first transistor T1 which is a driving transistor. The rest of functions of the timing control for the 5T2C pixel circuit of FIG. 6 would be exactly the same as that for controlling the 4T2C pixel circuit of FIG. 2, the detail descriptions can be referred to those paragraphs shown above.

In another aspect, the present disclosure provides an AMOLED display panel having a matrix of pixel circuits with each pixel circuit being configured the same way as shown in FIG. 2 and operated according to a same timing diagram shown in FIG. 3. Each pixel circuit in the matrix includes a first transistor having a bottom gate and a top gate, a drain supplied with a high-level power-supply voltage, and a source coupled to a light emitting diode (LED). The bottom gate is provided with a first voltage signal and the source is provided with a second voltage signal in a compensation period during which a present value of a threshold voltage of the first transistor is sensed at the source. A third voltage signal is determined based on the present value of the threshold voltage, and the top gate is configured to be provided with the third voltage signal in an emission period to reduce the present value of the threshold voltage. Optionally, the third voltage signal applied to the top gate changes the present value of the threshold voltage to substantially zero. Each pixel circuit in the matrix receives the first voltage signal from a data voltage port and the second voltage signal from a voltage sensing port in the compensation period to allow a present value of the threshold voltage of the first transistor to be deduced from a sense voltage detected via a voltage sensing port by a controller to determine a corresponding value for the third voltage signal to be applied to a voltage compensation port in the emission period. The LED is an organic light-emitting diode (OLED) having an anode coupled to the source of the first transistor and a cathode being supplied with a low-level power-supply voltage. The LED is configured in the emission period to emit light induced by a driving current provided by the first transistor that is a turn-on current substantially independent of the threshold voltage.

Optionally, the controller is configured to pre-store a correspondence relationship (e.g., a one-to-one correspondence relationship) between a top-gate voltage and a threshold voltage of the first transistor of each pixel circuit in the matrix and to determine the third voltage signal individually in the compensation period based on the present value of the threshold voltage deduced individually for each pixel circuit.

Optionally, the controller is further configured to apply the third voltage signal in the emission period to the top gate of the first transistor via the corresponding voltage compensation port of a corresponding pixel circuit to reduce the threshold voltage of the first transistor of each pixel circuit to substantially zero.

Figure 8:
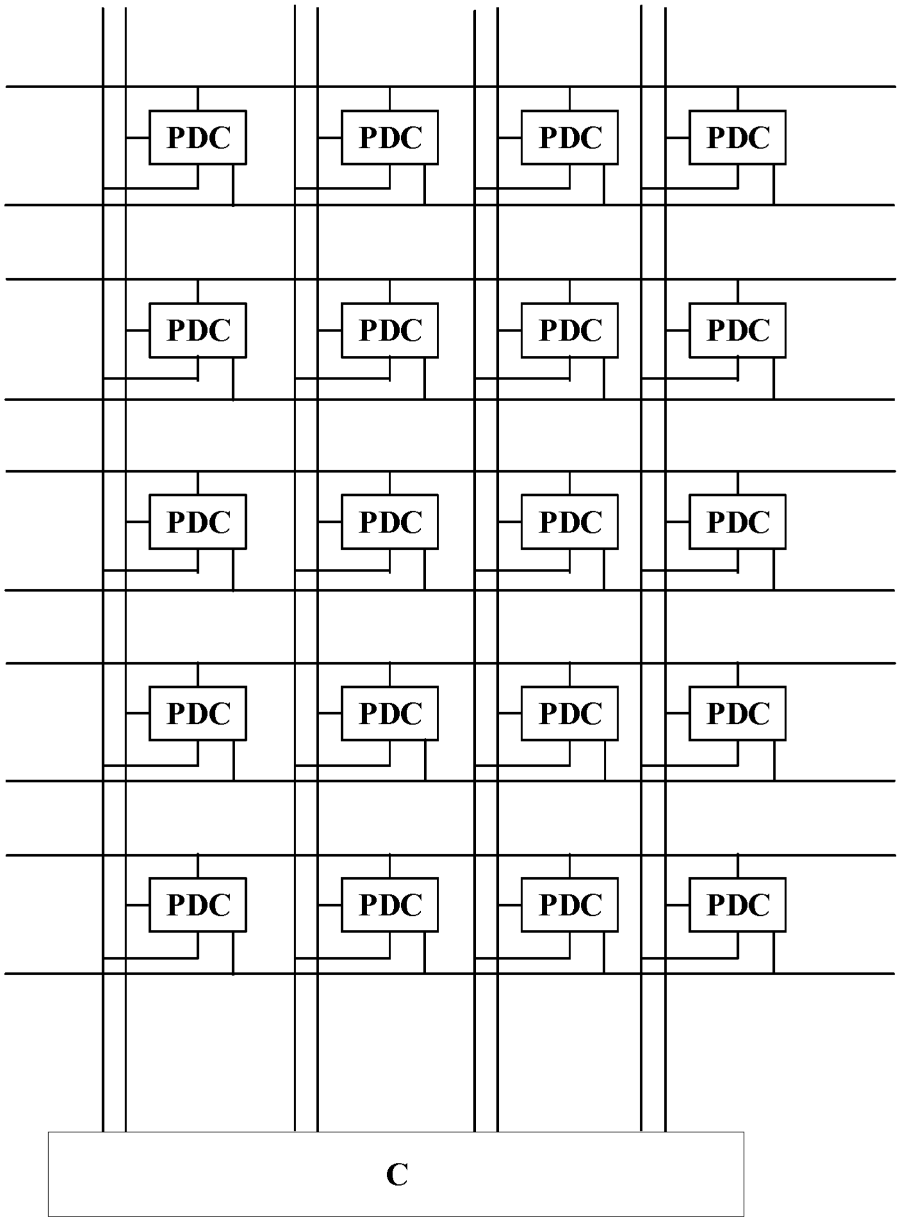
FIG. 8 is a schematic diagram of a display apparatus according to some alternative embodiments of the present disclosure.

In another aspect, the present disclosure provides a display apparatus including an AMOLED display panel described herein and a controller coupled to the AMOLED display panel and configured to pre-store a correspondence relationship (e.g., a one-to-one correspondence relationship) between a top-gate voltage and a threshold voltage of the first transistor of each pixel circuit in the matrix. The controller is further configured to determine the third voltage signal individually in the compensation period based on the present value of the threshold voltage deduced individually for each pixel circuit. The controller is additionally configured to apply the third voltage signal in the emission period to the top gate of the first transistor via the corresponding voltage compensation port of a corresponding pixel circuit to reduce the threshold voltage of the first transistor of each pixel circuit to substantially zero. Examples of appropriate display apparatuses include, but are not limited to, an electronic paper, a mobile phone, a tablet computer, a television, a monitor, a notebook computer, a digital album, a GPS, etc. FIG. 8 is a schematic diagram of a display apparatus according to some alternative embodiments of the present disclosure. Referring to FIG. 8, the display apparatus includes an AMOLED display panel having a matrix of pixel circuits PDC and a controller C coupled to the AMOLED display panel.

In yet another aspect, the present disclosure provides a method of compensating threshold voltage of driving transistor of a pixel circuit of an AMOLED display panel. In some embodiments, the method includes providing a dual-gate transistor as the driving transistor in the pixel circuit. The dual-gate transistor has a bottom gate and a top gate. FIG. 9 is a flow chart illustrating a threshold voltage compensation method according to some alternative embodiments of the present disclosure. Referring to FIG. 9, the method additionally includes operably providing a first voltage signal to the bottom gate and a second voltage signal to the source in a compensation period to sense a present value of a threshold voltage of the driving transistor. Furthermore, the method includes determining a third voltage signal based on the present value of the threshold voltage. Moreover, the method includes operably applying the third voltage signal to the top gate in an emission period to change the present value of the threshold voltage to substantially zero.

Optionally, the method includes providing the dual-gate transistor to form a pixel circuit described herein.

Optionally, the method is executed according to a timing diagram described herein. Referring to FIG. 9, the method includes providing the first voltage signal as a first high-level voltage signal to the data voltage port and providing the second voltage signal as a low-level voltage signal to the voltage sensing port in a reset sub-period of the compensation period. During the reset sub-period, the first control signal is a high-level voltage to turn the second transistor and the third transistor on and the second control signal is a low-level voltage to turn the fourth transistor off.

Referring to FIG. 9, the method includes providing the first voltage signal as a second high-level voltage signal to the data voltage port and leaving the voltage sensing port to be floated in a charge sub-period of the compensation period. During the charge sub-period, the first control signal remains the high-level voltage and the second control signal remains the low-level voltage to allow charging of the source of the dual-gate transistor to reach a potential level equal to that of the second high-level voltage signal minus the present value of the threshold voltage of the dual-gate transistor so that a driving chip can deduce the present value of the threshold voltage by sensing the potential level at the source of the dual-gate transistor via the voltage sensing port.

Referring to FIG. 9, the method includes selecting a top-gate voltage of the dual-gate transistor that corresponds to a threshold voltage the same as the present value but with an opposite sign based on a pre-stored information in the driving chip about a correspondence relationship between the top-gate voltage and the threshold voltage of the dual-gate transistor.

Referring to FIG. 9, the method further includes operably applying the third voltage signal to the top gate in an emission period by applying the third voltage signal to the voltage compensation port in the emission period. During the emission period, each of the first control signal and the second control signal is a high-level voltage to turn the second transistor, the third transistor, and the fourth transistor on, the first voltage signal is provided as a data signal to the data voltage port and the second voltage signal is provided as a low-level voltage signal to the voltage sensing port. The third voltage signal is passed to the top gate of the dual-gate transistor to reduce the threshold voltage to substantially zero. A turn-on current of the driving transistor is induced by the high-potential level of the data signal and provided as a driving current to cause the LED to emit light. The turn-on current is substantially independent of the threshold voltage of the dual-gate transistor.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pixel circuit in an active matrix organic light-emitting diode (AMOLED) display panel, comprising:

a first transistor comprising a bottom gate and a top gate, a drain supplied with a high-level power-supply voltage, and a source coupled to a light-emitting diode (LED);

a second transistor comprising a source coupled to the bottom gate of the first transistor, a drain coupled to a data voltage port, and a gate controlled by a first control signal;

a third transistor comprising a source coupled to the source of the first transistor, a drain coupled to a voltage sensing port, a gate controlled by the first control signal;

a fourth transistor comprising a source coupled to the top gate of the first transistor, a drain coupled to a voltage compensation port, and a gate controlled by a second control signal;

a first capacitor comprising a first electrode coupled to the bottom gate of the first transistor and a second electrode coupled to the source of the first transistor; and a second capacitor comprising a first electrode coupled to the drain of the first transistor and a second electrode coupled to the top gate of the first transistor;

wherein the bottom gate is provided with a first voltage signal and the source of the first transistor is provided with a second voltage signal in a compensation period during which a present value of a threshold voltage of the first transistor is sensed at the source of the first transistor and a third voltage signal is determined based on the present value of the threshold voltage;

the top gate is configured to be provided with the third voltage signal in an emission period to reduce the present value of the threshold voltage;

the first control signal is a high-level voltage to turn the second transistor and the third transistor on and the second control signal is a low-level voltage to keep the fourth transistor off in a reset sub-period of the compensation period;

the first control signal remains to be the high-level voltage, the second control signal remains to be the low-level voltage in a charge sub-period of the compensation period subsequent to the reset sub-period;

the data voltage port is configured to provide a first high-level voltage signal as the first voltage signal to set a high potential level at the bottom gate in the reset sub-period and the voltage sensing port is configured to provide the second voltage signal as a low-level voltage signal to set a low potential level at the source of the first transistor in the reset sub-period;

the data voltage port is configured to provide a second high-level voltage signal as the first voltage signal in the charge sub-period, and the voltage sensing port is configured to be floated by cutting off the second voltage signal in the charge sub-period; and the high potential level at the bottom gate turns the first transistor on to allow the source of the first transistor being charged by the high-level power-supply voltage until a potential level of the source of the first transistor is equal to the high potential level at the bottom gate minus the present value of the threshold voltage of the first transistor.

2. The pixel circuit of claim 1, wherein the LED is an organic light-emitting diode (OLED) comprising an anode coupled to the source of the first transistor and a cathode being supplied with a low-level power-supply voltage, the OLED being configured in the emission period to emit light induced by a driving current provided by the first transistor, the driving current being a turn-on current of the first transistor substantially independent of the threshold voltage.

3. The pixel circuit of claim 2, wherein the turn-on current through the first transistor is substantially independent of the low-level power-supply voltage supplied to the cathode of the LED.

4. The pixel circuit of claim 1, wherein the voltage sensing port that is floated is used to detect the potential level at the source of the first transistor as a sensed voltage by a controller to deduce the present value of the threshold voltage based on the sensed voltage.

5. The pixel circuit of claim 4, wherein the present value of the threshold voltage is used by the controller to determine the third voltage signal based on a pre-stored information about a correspondence relationship between a top-gate voltage and a threshold voltage of the first transistor; and the third voltage signal is selected from a value of the top-gate voltage that corresponds to a threshold voltage having an absolute value substantially the same as the present value of the threshold voltage but with an opposite sign.

6. The pixel circuit of claim 5, wherein the pixel circuit is one of a plurality of pixel circuits in the AMOLED display panel;

the correspondence relationship between a top-gate voltage and a threshold voltage of the first transistor of each one of the plurality of pixel circuits is stored in the controller which is configured to sense a present value of the threshold voltage from a corresponding voltage sensing port of each of the plurality of pixel circuits and provide a corresponding third voltage signal to a corresponding voltage compensation port of the each of the plurality of pixel circuits based on the present value of the threshold voltage sensed by the controller.

7. The pixel circuit of claim 5, wherein the first control signal is a high-level voltage to turn on the second transistor to allow the first voltage signal as a data signal to be applied from the data voltage port to the bottom gate and turn on the third transistor to allow the second voltage signal as a low-level voltage signal to be applied from the voltage sensing port to the source of the first transistor in the emission period; and the second control signal is a high-level voltage to turn on the fourth transistor to allow the third voltage signal to be applied via the voltage compensation port to the top gate; thereby resulting in a changed value of threshold voltage to be substantially zero; and a turn-on current of the first transistor is provided to the LED as a light-emitting driving current substantially independent of the changed value of threshold voltage.

8. The pixel circuit of claim 1, wherein the compensation period is followed by a holding period before the emission period starts, during the holding period the first voltage signal and the second voltage signal are provided with low-level voltages.

9. An active matrix organic light emitting diode (AMOLED) display panel comprising a matrix of pixel circuits, a respective pixel circuit in the matrix comprises:

a first transistor comprising a bottom gate and a top gate, a drain supplied with a high-level power-supply voltage, and a source coupled to a light emitting diode (LED);

a second transistor comprising a source coupled to the bottom gate of the first transistor, a drain coupled to a data voltage port, and a gate controlled by a first control signal;

a third transistor comprising a source coupled to the source of the first transistor, a drain coupled to a voltage sensing port, a gate controlled by the first control signal;

a fourth transistor comprising a source coupled to the top gate of the first transistor, a drain coupled to a voltage compensation port, and a gate controlled by a second control signal;

a first capacitor comprising a first electrode coupled to the bottom gate of the first transistor and a second electrode coupled to the source of the first transistor; and a second capacitor comprising a first electrode coupled to the drain of the first transistor and a second electrode coupled to the top gate of the first transistor;

wherein the bottom gate is provided with a first voltage signal and the source of the first transistor being provided with a second voltage signal in a compensation period during which a present value of a threshold voltage of the first transistor is sensed at the source of the first transistor and a third voltage signal is determined based on the present value of the threshold voltage;

the top gate is configured to be provided with the third voltage signal in an emission period to reduce the present value of the threshold voltage;

the first control signal is a high-level voltage to turn the second transistor and the third transistor on and the second control signal is a low-level voltage to keep the fourth transistor off in a reset sub-period of the compensation period;

the first control signal remains to be the high-level voltage, the second control signal remains to be the low-level voltage in a charge sub-period of the compensation period subsequent to the reset sub-period;

the data voltage port is configured to provide a first high-level voltage signal as the first voltage signal to set a high potential level at the bottom gate in the reset sub-period and the voltage sensing port is configured to provide the second voltage signal as a low-level voltage signal to set a low potential level at the source of the first transistor in the reset sub-period;

the data voltage port is configured to provide a second high-level voltage signal as the first voltage signal in the charge sub-period, and the voltage sensing port is configured to be floated by cutting off the second voltage signal in the charge sub-period; and the high potential level at the bottom gate turns the first transistor on to allow the source of the first transistor being charged by the high-level power-supply voltage until a potential level of the source of the first transistor is equal to the high potential level at the bottom gate minus the present value of the threshold voltage of the first transistor.

10. The AMOLED display panel of claim 9, wherein the LED is an organic light-emitting diode comprising an anode coupled to the source of the first transistor and a cathode being supplied with a low-level power-supply voltage, the LED being configured in the emission period to emit light induced by a driving current provided by the first transistor that is a turn-on current substantially independent of the threshold voltage.

11. The AMOLED display panel of claim 9, wherein the respective pixel circuit is configured to receive the first voltage signal from the data voltage port and the second voltage signal from the voltage sensing port in the compensation period to allow the present value of the threshold voltage of the first transistor to be deduced from a sense voltage detected via the voltage sensing port by a controller to determine a corresponding value for the third voltage signal to be applied to the voltage compensation port in the emission period.

12. The AMOLED display panel of claim 11, wherein the controller is configured to pre-store a correspondence relationship between a top-gate voltage and a threshold voltage of the first transistor of the respective pixel circuit in the matrix and to determine the third voltage signal for the respective pixel circuit in the compensation period based on the present value of the threshold voltage deduced for the respective pixel circuit.

13. The AMOLED display panel of claim 12, wherein the controller is further configured to apply the third voltage signal in the emission period to the top gate of the first transistor via a corresponding voltage compensation port of a corresponding pixel circuit to change the threshold voltage of the first transistor of the corresponding pixel circuit to substantially zero.

14. A display apparatus comprising:

an AMOLED display panel of claim 9; and a controller coupled to the AMOLED display panel and configured to pre-store a correspondence relationship between a top-gate voltage and a threshold voltage of the first transistor of the respective pixel circuit in the matrix, to determine the third voltage signal for the respective pixel circuit in the compensation period based on the present value of the threshold voltage deduced for the respective pixel circuit, and to apply the third voltage signal in the emission period to the top gate of the first transistor via a corresponding voltage compensation port of a corresponding pixel circuit to reduce the threshold voltage of the first transistor of the respective pixel circuit.

15. A method of compensating a threshold voltage of a driving transistor of a pixel circuit of an AMOLED display panel, comprising:

providing a dual-gate transistor as the driving transistor in the pixel circuit, the dual-gate transistor comprising a bottom gate and a top gate;

providing a first voltage signal to the bottom gate and a second voltage signal to a source of the dual-gate transistor in a compensation period to sense a present value of a threshold voltage of the dual-gate transistor;

determining a third voltage signal based on the present value of the threshold voltage; and applying the third voltage signal to the top gate in an emission period of an operation timing to change the present value of the threshold voltage of the dual-gate transistor to proximately zero;

wherein the pixel circuit comprises:

the dual-gate transistor having a drain being supplied with a high-level power-supply voltage;

a second transistor comprising a source coupled to the bottom gate of the dual-gate transistor, a drain coupled to a data voltage port, and a gate controlled by a first control signal;

a third transistor comprising a source coupled to the source of the dual-gate transistor, a drain coupled to a voltage sensing port, a gate controlled by the first control signal;

a fourth transistor comprising a source coupled to a top gate of the dual-gate transistor, a drain coupled to a voltage compensation port, and a gate controlled by a second control signal;

a first capacitor comprising a first electrode coupled to the bottom gate of the dual-gate transistor and a second electrode coupled to the source of the dual-gate transistor; and a second capacitor comprising a first electrode coupled to the drain of the dual-gate transistor and a second electrode coupled to the top gate of the dual-gate transistor;

wherein the AMOLED display panel comprises a light-emitting diode comprising an anode coupled to the source of the dual-gate transistor and a cathode being supplied with a low-level power-supply voltage;

wherein providing the first voltage signal to the bottom gate and the second voltage signal to the source of the dual-gate transistor in the compensation period comprises providing a first high-level voltage signal as the first voltage signal to the data voltage port and providing a low-level voltage signal as the second voltage signal to the voltage sensing port in a reset sub-period of the compensation period, during which the first control signal is a high-level voltage to turn the second transistor and the third transistor on and the second control signal is a low-level voltage to turn the fourth transistor off;

wherein providing the first voltage signal to the bottom gate and the second voltage signal to the source of the dual-gate transistor in the compensation period further comprises providing a second high-level voltage signal as the first voltage signal to the data voltage port and leaving the voltage sensing port to be floated in a charge sub-period of the compensation period, during which the first control signal remains the high-level voltage and the second control signal remains the low-level voltage to allow charging of the source of the dual-gate transistor to reach a potential level equal to that of the second high-level voltage signal minus the present value of the threshold voltage of the dual-gate transistor so that a driving chip can deduce the present value of the threshold voltage of the dual-gate transistor by sensing the potential level at the source of the dual-gate transistor via the voltage sensing port.

16. The method of claim 15, wherein determining the third voltage signal comprises selecting a top-gate voltage of the dual-gate transistor that corresponds to a threshold voltage the same as the present value but with an opposite sign based on a correspondence relationship between the top-gate voltage and the threshold voltage of the dual-gate transistor, the correspondence relationship being pre-stored in the driving chip.

17. The method of claim 16, wherein applying the third voltage signal to the top gate in an emission period comprises applying the third voltage signal to the voltage compensation port in the emission period during which each of the first control signal and the second control signal is a high-level voltage to turn the second transistor, the third transistor, and the fourth transistor on, the first voltage signal is provided as a data signal to the data voltage port and the second voltage signal is provided as a low-level voltage signal to the voltage sensing port, wherein the third voltage signal is passed to the top gate of the dual-gate transistor to reduce the threshold voltage of the dual-gate transistor and a turn-on current of the dual-gate transistor is induced by high-potential level of the data signal and provided as a driving current to cause the LED to emit light, the turn-on current being substantially independent of the threshold voltage of the dual-gate transistor.

* * * * *